Dec. 7, 1971   M. R. GATHERIDGE   3,624,989
ATTACHMENT FOR ROTARY LAWN MOWERS
Filed Nov. 2, 1970
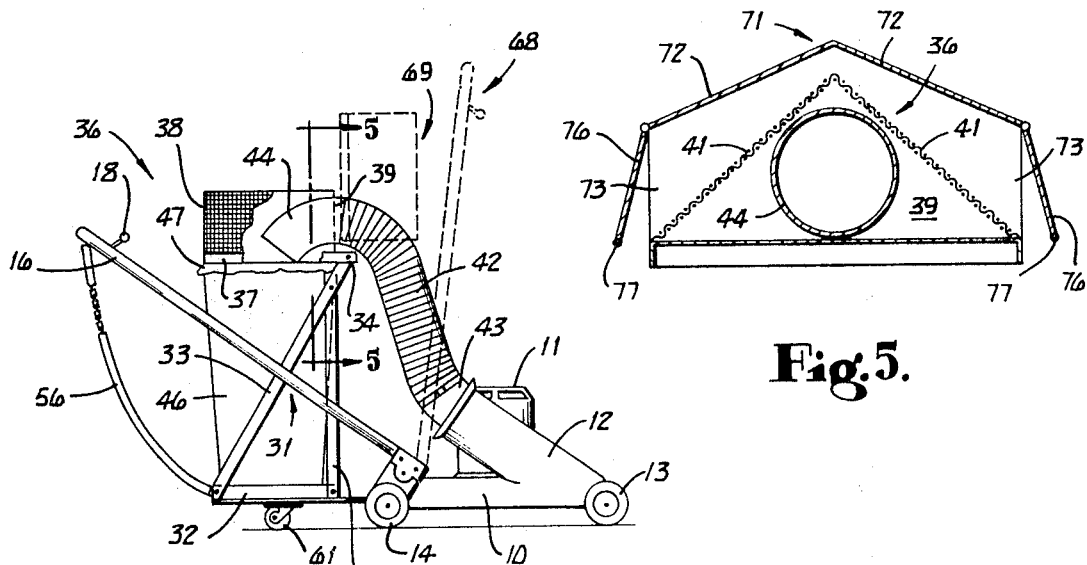
Fig.1.
Fig.5.
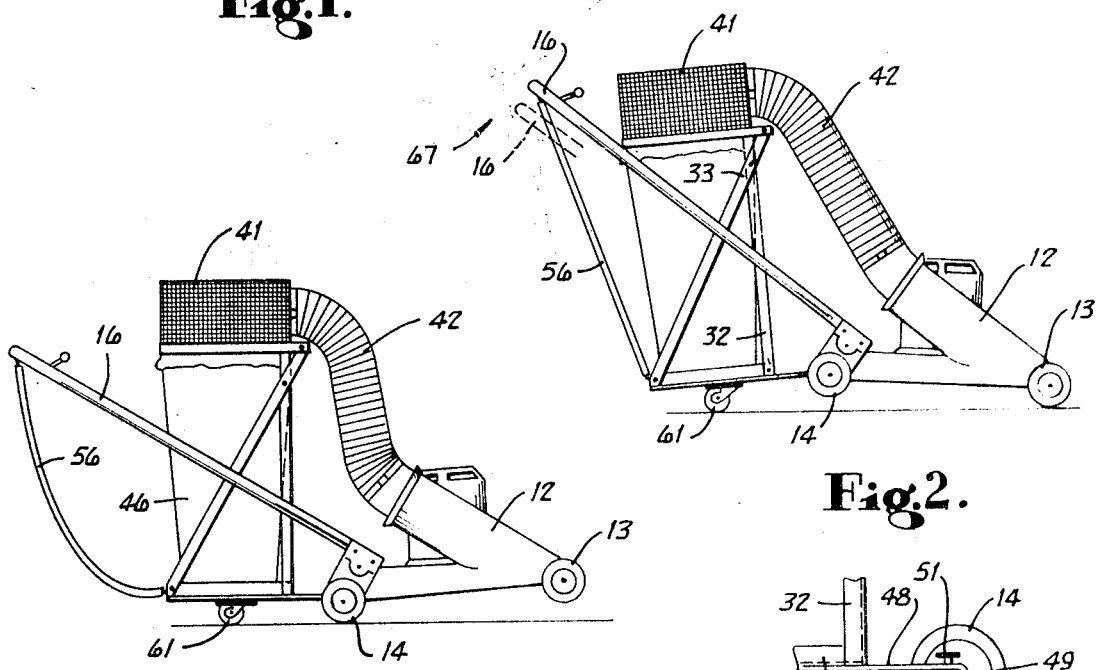
Fig.2.
Fig.3.
Fig.6.
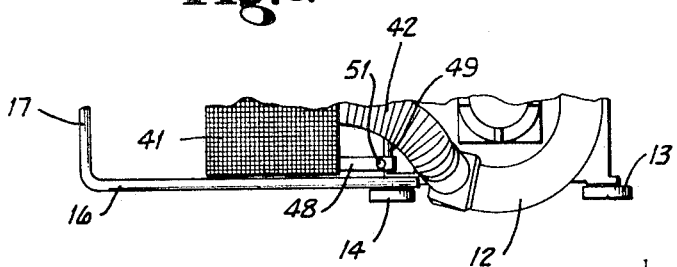
Fig.4.
INVENTOR
MARVIN R. GATHERIDGE
BY
Woodard, Weikart, Emhardt & Naughton
ATTORNEYS United States Patent Office 3,624,989
Patented Dec. 7, 1971

3,624,989
ATTACHMENT FOR ROTARY LAWN MOWERS
Marvin R. Gatheridge, 6626 Barr Will Drive,
Indianapolis, Ind. 46220
Filed Nov. 2, 1970, Ser. No. 85,862
Int. Cl. A01d 35/22
U.S. Cl. 56—202                                   8 Claims

ABSTRACT OF THE DISCLOSURE

Disclosed is a castered support frame, carrying a collecting container for clippings, leaves, etc., the container being accommodated between the conventional mower handle arms. The support frame is pivotally coupled to the lower, rear portion of the mower, and the frame supporting casters are positioned so that the weight of the loaded container does not interfere with the maneuverability of the mower.

BACKGROUND OF THE INVENTION

The conventional lawn mower with the bagging or grass catching attachment is helpful in the collecting of grass clippings and leaves, however, emptying of the catcher bag has disadvantages in that it must be unbuttoned, unzippered, and unfastened from the mower, held over another container and dumped in order to remove the contents. Often, where leaves are shredded and collected by the mower, the bag contents are dumped on a pile and burned because of the inconvenience involved in packaging the shredded leaves and clipping for regular pick-up by the usual trash collection agency. The apparatus of the present invention reduces the inconvenience of unloading conventional rotary mowers thereby reducing the disposal of clippings and shredded leaves by burning and hence reducing that substantial component the total air pollution which has become a grave problem in various population centers. Shredded leaves, when collected and compacted in closed bags as is envisaged with the use of the apparatus of the present invention, can be accommodated more readily by proposed processes for recycling such material into high-grade humus and fertilizers.

The convenience in bagging and disposal of clippings and shredded leaves is provided by the mower attachment of the present invention without adversely affecting the maneuverability of the mower. Maneuverability of a mower, with the attachment of the present invention, is indeed improved over that of a mower with the conventional overhung, side-attached catcher bag since there is no tendency to tilt or tip the mower as the clipping load increases, a condition inherent in conventional devices.

BRIEF DESCRIPTION OF THE DRAWINGS

FIG. 1 is a side view of a conventional, rotary power mower with the attachment assembly of the present invention attached to it.

FIG. 2 is a view similar to FIG. 1 but showing the mower handle elevated so as to lift the rear mower wheels from the ground.

FIG. 3 is a view similar to FIG. 1 but showing the mower handle lowered so as to raise the front mower wheels from the ground.

FIG. 4 is a fragmentary, top plan view of the structure shown in FIG. 1.

FIG. 5 is a sectional view taken generally along the line 5—5 of FIG. 1 and showing, additionally a deflector cap superimposed on the container cover.

FIG. 6 is a fragmentary side view illustrating the pivotal attachment of the frame to the lower rear portion of the mower.

DESCRIPTION OF THE PREFERRED EMBODIMENT

Referring initially to FIG. 1, there is shown a conventional rotary mower having a deck 10, and engine or driving element 11 and a volute discharge duct terminating in an upwardly and rearwardly extending portion 12. The mower is provided with a pair of front support wheels 13 and rear support wheels 14.

Attached to the rear portion of the mower deck adjacent the wheels 14 is a handle assembly which includes upwardly extending handle arms 16 which are joined at their outer ends by a cross member 17 (FIG. 4). The conventional engine throttle control 18 is supported on the mower handle. The structure so far described, it will be understood, is conventional and typical of rotary, powered lawn mowers.

The attachment assembly for the mower, embodying the present invention, includes a frame generally indicated at 31 which is composed of a rectangular base 32, spaced parallel upright members 30 and spaced diagonal members 33, only one of the members 30, 32 and 33 being visible in FIG. 1. The diagonal members 33 extend slightly beyond the upright members 32 and provide a pivot axis 34 for a container covered indicated generally at 36.

The container cover has base members 37 and, as will be particularly evident from FIG. 5, is formed in a triangular prism configuration having end members 38 and 39 which may be formed of sheet metal or plastic and inclined sides 41 which are formed of a material impervious to air discharged from the mower but impervious to clippings, shredded leaves, etc. discharged by the mower.

The attachment includes a tubular, flexible duct 42 which is attached by a clamp to an adaptor 43 positioned at the outlet end of the mower discharge duct 12. The upper end of the duct 42 is attached, by a clamp, to a rigid tube 44 which extends through the adjacent end member 39 of the cover and is formed so as to discharge material introduced into it by the duct 42 downwardly toward the base 32 of the frame. Accommodated on the base 32 of the frame is a container 46 which is generally rectangular in cross-section and is provided with a slight taper or draft from bottom to top. The top of the container 46 is sized so as to closely interfit the overlying cover 36. A plastic bag-liner is preferably inserted in the container, the marginal portion of the bag-liner being indicated at 47 in FIG. 1, this portion extending exteriorly of the container and being held in place by the overlying cover. The base 32 of the frame has extending forwardly therefrom, on each of its sides, the members 48. These members 48 are formed so as to extend around the axle 49 of the rear mower wheels 14 as indicated in FIG. 6. A member 51, which can be withdrawn from the members 48, completes the pivotal attachment of the frame to the rear axle of the mower wheels 14. While the frame is shown attached to the rear axle of the mower wheels in FIG. 6 herein, it will be understood that a pivotal attachment of the members 48 extending from the frame 31 to the rear lower portion of the mower is the functional requirement and the attachment to the rear mower wheel axle is merely a convenient scheme for achieving the functional requirement. A flexible, tension member taking the form of a chain 56 is secured to the lower rear portion of the frame 32 and is detachably secured, at its upper end, to the cross bar portion 17 of the mower handle.

In operation, as the mower is pushed over a lawn, the attachment frame 31 will be drawn behind the mower and clippings and shredded leaves will be blown through the duct 42 and directed by the member 44 into the container provided with bag-liner 47. The air permeable, inclined sides 41 of the cover 36 permit the exit of air from the system and the triangular prism configuration provides the necessary area of air permeable material (inclined sides 41) to prevent back pressure developing in the mower discharge duct 12. As the container 46 fills, its weight becomes substantial, however, it will be noted that the vertical centerline of the container is generally aligned vertically with the axis of rotation of spaced, swivel caster wheels 61 which depend from opposite sides of the underface of the base 32 of the frame and support the frame and container as it moves behind the mower. Since the center of gravity of the container 46 and its contents is directly above the caster wheels 61, no portion of this weight is applied to the mower wheels and the increasing weight of the container as it is filled does not affect the manueverability of the mower.

Referring to FIG. 2, the normal position for the mower handles 16 is shown in broken lines at 67. If the rear mower wheels are to be raised from the ground permitting the mower to be pivoted at its front wheels, the mower handles 16 are raised to their solid line position of FIG. 2, thereby raising the mower wheels 14 off the ground while the front wheels 13 and the attachment caster wheels 61 remain in contact with the ground. The weight of the container and its contents does not affect the force necessary to raise the mower handles 16 to their solid line position of FIG. 2. If manuevering of the mower requires that its front wheels 13 be elevated off the ground, the mower handle arms 16 may be pushed downwardly thereby elevating the front wheels 13 as shown in FIG. 3. This conventional manipulation of the mower handle arms and the manuevering of the mower thereafter is not impeded by the presence of the frame 31 and the container 46 because the weight of the frame and container are not transferred to the mower wheels. Unloading of the attachment when the container 46 is full may be accomplished by moving the mower arms 16 to their stowed position indicated in broken lines at 68 in FIG. 1. The cover 36 for the container may then be pivoted to its broken line position, indicated at 69 in FIG. 1. The loaded bag may then be closed and tied or wired and the container may then be tilted and pivoted on its lower rear margin, thus inverting the container and depositing the closed bag of clippings and shredded leaves. The closed, inverted bag is thus positioned for convenient pick-up by a scavaging agency.

Referring to FIG. 5 a cap or hood, indicated generally at 71 is shown superimposed on the cover 36. As will be noted from FIG. 1 when the attachment is in operation, the closed end 38 of the cover prevents the discharge of air, and the fine dust entrained in it, into the operator's face. The cap 71 however, further insures against inconveniencing the operator of the mower by the discharge of dust through the inclined surfaces 41. The hood 71 has a configuration which is similar to that of the cover 36, however, its inclined sides 72 are formed of air impervious plastic material and are of less inclination when compared to the sides 41 so as to provide apertures 73 at each side of the hood through which the air and dust passing through the sides 41 may be discharged and directed downwardly. Depending from the edges of the inclined sides 72 of the hood and depending therefrom so as to cover the apertures 73 are panels or flaps 76. The lower margins of the flaps 76 are provided with stiffening wires or weights 77 which make the flaps more stable and aid in holding the flaps in a downwardly directed position when the mower is in operation. These flaps 76 move outwardly under the pressure of air exiting through the apertures 73 and fall to aperture closing position when the mower is off and no air is flowing through the apertures. The position of the flaps 76 thus gives an indication of any clogging or abnormal interruption or lessening of the air flow through the mower discharge duct or the duct 42 while the mower is in operation and provides the operator with a visual means of determining when clogging or other abnormal operation of the mower is occurring.

It should be noted that the attachment is arranged so that there are no relatively sharp right angle turns for the duct 42, the configuration of the cover 36 is such that a relatively large area of air permeable surface (inclined sides 41) is provided so as to prevent excessive back pressure on the system. The support for the container and its contents is such that the weight of the container and its contents is not transferred to the mower wheels and he manueverability of the mower is not adversely affected by the presence of the attachment. While the container is here described as utilizing a bag-liner which may be closed and dumped conveniently from the container, it will be understood that the container could be used and positioned on the frame 31 without the presence of the bag-liner 47.

What is claimed is:

1. An attachment assembly for a rotary power mower of the type having spaced handle arms extending rearwardly therefrom, said mower having a discharge duct, said assembly comprising a wheeled frame adapted for pivotal attachment to the lower rear portion of a power mower and to be drawn in trailing position after the mower, said frame including a base substantially spanning the distance between the mower handle arms, a container accommodated on said base and extending between said arms, a cover for said container pivotally attached to said frame, a tubular conduit extending from said cover and providing communication between the mower discharge duct and the interior of said container, said container cover being pervious to air but impervious to clippings and debris passing through said conduit, the hinged connection of said cover to said frame permitting it to be raised from the container for removal of the container from said frame base.

2. An attachment assembly as claimed in claim 1 in which said container cover has a triangular prism configuration with its triangular end surfaces disposed transverse to the direction of movement of the mower and that end surface adjacent the mower accommodating said conduit, said cover end surfaces being solid and the inclined side surfaces being formed of air pervious material.

3. An attachment assembly as claimed in claim 2 in which a dust deflector cap is superimposed on said container cover, said cap having openings adjacent said inclined side surfaces of said cover, and flaps covering said cap openings and depending from the adjacent surfaces of said cap, the attitude assumed by said flaps when the mower is in operation serving to deflect downwardly any fine dust or the like passing through said cover side walls.

4. An attachment assembly as claimed in claim 1 in which said frame includes a wheeled caster mounted adjacent the underface of the frame base with the center of the caster wheel being substantially aligned vertically with the vertical centerline of a container disposed on the frame base.

5. An attachment assembly as claimed in claim 1 in which said frame includes a wheeled caster mounted at opposite side margins of the frame base and adjacent the underface of the base to support said frame, the center of each of said caster wheels being substantially aligned vertically with the vertical centerline of the container disposed on the frame base.

6. An attachment assembly as claimed in claim 5 including a flexible tension member detachably secured between said frame base and the upper end of the mower handle arms, elevation of the mower handle to lift the rear mower wheels from the ground a predetermined amount thereby also lifting the frame caster wheels clear of the ground.

7. An attachment assembly as claimed in claim 1 in which the container accommodated by the frame has a slight draft and is provided with a removable flexible bag liner which terminates adjacent the junction of the container and said cover, the container draft permitting dumping of the filled bag liner from the container.

8. An attachment assembly as claimed in claim 1 wherein a deflecting tube is supported within said cover and is attached concentrically to said tubular conduit, said deflecting tube having its open end generally directed toward the bottom of the container to direct material passing through said tubular conduit toward the container bottom.

References Cited

UNITED STATES PATENTS

| | | | |
|---|---|---|---|
| 2,701,943 | 2/1955 | Johnson | 56—194 |
| 3,191,370 | 6/1965 | Epstein | 56—202 |
| 3,199,277 | 8/1965 | Moody | 56—202 |

ANTONIO F. GUIDA, Primary Examiner

U.S. Cl. X.R.

15—79, 347

UNITED STATES PATENT OFFICE
CERTIFICATE OF CORRECTION

Patent No. 3,624,989　　　　　　　　Dated December 7, 1971

Inventor(s) Marvin R. Gatheridge

It is certified that error appears in the above-identified patent and that said Letters Patent are hereby corrected as shown below:

Column 2, line 36 "impervi-" should be "pervi-"

Signed and sealed this 16th day of May 1972.

(SEAL)
Attest:

EDWARD M. FLETCHER, JR.　　　　　　ROBERT GOTTSCHALK
Attesting Officer　　　　　　　　　Commissioner of Patents